United States Patent [19]
Arnold et al.

[11] 3,780,302
[45] Dec. 18, 1973

[54] PULSED NEUTRON LOGGING SYSTEM

[75] Inventors: Dan M. Arnold; Ward E. Schultz; Harry D. Smith, Jr., all of Houston, Tex.

[73] Assignee: Texaco Inc., Houston, Tex.

[22] Filed: Sept. 20, 1971

[21] Appl. No.: 182,035

[52] U.S. Cl. ............................ 250/301, 250/270
[51] Int. Cl. ............................................ G01t 1/16
[58] Field of Search .............. 250/83.6 W, 83.6 S, 250/83.3 R, 71.5 R

[56] References Cited
UNITED STATES PATENTS
3,483,376  12/1969  Locke et al. .............. 250/83.6 W X

*Primary Examiner*—Walter Stolwein
*Assistant Examiner*—Davis L. Willis
*Attorney*—Thomas H. Whaley et al.

[57] ABSTRACT

An illustrative embodiment of the invention includes improved nuclear well logging methods and apparatus for investigating subsurface earth formations. A pulsed neutron generator is used to irradiate the earth formations and the gamma rays caused by the inelastically scattered neutrons are observed in four energy windows. The carbon/oxygen ratio and the silicon/calcium ratio and the counting rate in each window are obtained and used to resolve ambiguities in the oil/water content of the formations by appropriately combining the measurements to obtain the lime factor or fraction and the water saturation $S_w$ of the formations, which quantities are then recorded as a function of the borehole depth.

19 Claims, 4 Drawing Figures

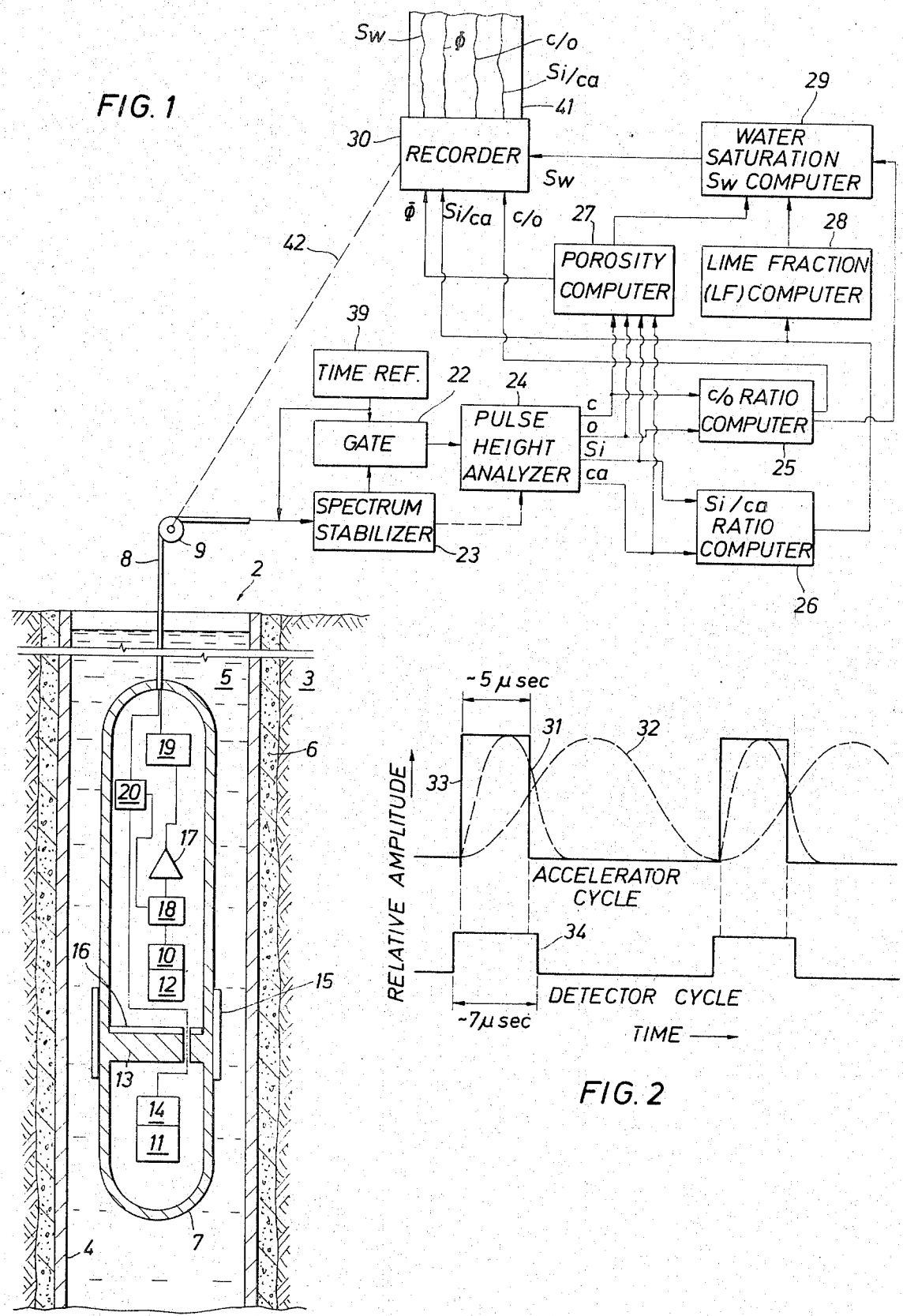

PULSED NEUTRON LOGGING SYSTEM

BACKGROUND OF THE INVENTION

This invention relates to radiological well logging methods and apparatus for investigating the characteristics of subsurface earth formations traversed by a borehole and, more particularly, relates to improved neutron-gamma ray logging methods and apparatus.

It is well known that oil and gas are more likely to be found in commercially recoverable quantities from those earth formations which are relatively porous and permeable than in more highly consolidated earth formations. It is also well known that an oil or gas producing formation may be located by passing a neutron source through the borehole and measuring the intensity of secondary gamma ray radiation developing from the neutron irradiation as a function of borehole depth.

In particular a chlorine nucleus, which has a very high thermal neutron capture cross section (more so than that of the nuclei of other rather commonly found elements) is a good indicator of the location of salt water. Thus, salt water filled limestone or sandstone layers will have a greater macroscopic thermal neutron capture cross section than an oil saturated layer will. When combined with other porosity information, oil can thus be detected. This difference has been observed in the past by measuring either chlorine capture gamma rays or the lifetime or decay constant of the thermal neutron population in the layer in question.

The above-mentioned salt water detection techniques have proven to be very useful in the past in locating oil and gas bearing earth formations. However, many spurious indications have been produced by this logging technique due to the fact that it depends on the presence of a rather large amount of sodium chloride in the fluid. There has been no commercially available well logging method which could distinguish oil from water in earth formations when the water salinity is low. For example, the above-mentioned chlorine or neutron lifetime logs require water salinities in excess of about 30,000 parts per million of sodium chloride before oil located in the pores of the formation can be differentiated from water.

Accordingly, it has been proposed in the prior art to make a measurement of at least a portion of the gamma ray energy spectrum due to inelastic neutron scattering events from neutron irradiated earth formations. This has been proposed because carbon and oxygen have significant inelastic cross sections while having relatively small capture cross sections. Thus, the carbon and oxygen nuclei in the earth formations surrounding the borehole will engage in appreciable inelastic scattering interactions with the bombarding neutrons. Gamma rays resulting from inelastic neutron scattering interaction will be referred to henceforth as inelastic gamma rays. However, this approach has been limited in the past to some extent because the inelastic scattering cross section for carbon and oxygen only become appreciable if relatively high energy neutrons are available to provide the interaction. In the past it has been difficult to provide sufficient quantities of energetic neutrons to reliably perform this type of log. The development of improved pulsed neutron generators has made possible the measurement of the inelastic scattering gamma ray energy spectrum from relatively high energy neutron irradiated earth formations. Attempts have been made to measure the carbon and oxygen inelastic scattering interactions with 14 MEV neutrons generated in pulsed neutron generators of the deuterium-tritium reaction type.

To the present, however, none of the proposed methods utilizing this concept have proven reliable. One of the main reasons for lack of success in these attempts has been that carbon is present in significant amounts in the earth's crust. Moreover, limestone formations are largely composed of calcium carbonate and thus a water bearing limestone formation can produce more carbon gamma rays due to inelastic scatterings than an oil filled sand or shale. The carbon/oxygen ratio has also been found to be a function of porosity. However, it has also been found that the water saturation of earth formations may be found in the manner to be described, by measuring the carbon/oxygen ratio.

Another problem in making inelastic gamma ray measurements has been due to the fact that the gamma ray generated by the neutron inelastic scattering can itself engage in multiple Compton scattering interactions. Such gamma ray scattering generally tends to make the scattered gamma ray lose energy to some extent with each interaction. Thus, a gamma ray having a particular initial energy generated by the inelastic scattering of a neutron by a carbon or oxygen nucleus can have a totally different energy (which could be assumed to be its initial energy) by the time it reaches the detector in the logging sonde. This type of process generally masks or smears inelastic gamma ray energy spectra.

Even if the improved pulsed neutron sources which are now available are used to perform the inelastic neutron scattering log, the neutron output must be limited to a relatively small number of neutrons during each pulse so that pulse pile up in the system electronics will not destroy the signal and resolution from formation gamma rays. Pulse pile up results from the fact that the system, including the electronic circuits and the well logging cable, have only the capability to effectively count at a finite instantaneous counting rate. Also, in this regard, the neutron source to gamma ray detector spacing becomes particularly critical in regulating the count rate so as not to exceed the finite instantaneous count rate limitation of the system. Thus, in order to enhance the statistical accuracy of the measurements (which generally is a function of the total number of counts) the source/detector spacing and pulse repetition rate of the pulsed neutron source may be varied to obtain the optimum results; the duration of each individual neutron pulse is also made as short as possible (5 microseconds). It is possible to obtain a source/detector spacing and pulse repetition rate which will provide a maximum number of total counts while not exceeding the instantaneous count rate limitation of the system during the individual inelastic gamma ray measuring intervals which coincide with the neutron pulse duration. Also, keeping the pulse duration as short as possible cuts down the count rate due to thermal neutron capture events since, as will be discussed subsequently, there is not a long enough time duration for such thermal neutron background to build up during the pulse. However, increasing the pulse repetition rate too much can lead to the existence, during the counting interval for inelastic gamma rays, of a large thermal neutron population from a previous neutron pulse. This problem can be dealt with, however.

It will be appreciated by those skilled in the art, that the foregoing discussion of the parameters which may be varied to optimize the logging speed and counting statistics are interdependent, not only with each other but also with physical parameters of the well bore being examined. For example, the bore hole diameter, relative thickness of casing and cement sheath and type of borehole fluid can all effect the inelastic gamma ray count rates. Thus, in order to obtain reasonable count rates at reasonable source/detector spacing and still maintain resolvable gamma ray pulses which are not seriously deteriorated by the pulse pileup phenomena, it is desirable to repeat the neutron pulses at a high rate.

Accordingly, it is an object of the present invention to provide an improved method and apparatus for obtaining information indicating the presence of oil bearing formations in relatively low salinity earth structures.

A further object of the invention is to provide new and improved methods and apparatus for determining the carbon/oxygen ratio in earth formations surrounding a well borehole.

A still further object of the invention is to provide a well logging system which is a direct indicator of oil in earth formations surrounding a well borehole independently of the presence of chlorine in these formations.

Yet another object of the present invention is to provide an improved well logging system indicative of the presence of oil and formation lithology and porosity and water saturation.

The above and other objects, features and advantages of the present invention are provided in a pulsed neutron well logging system. The system utilizes four energy dependent windows or intervals in the gamma ray energy spectrum. Time dependent gate means isolate gamma rays resulting from inelastic scattering of neutrons by earth formations surrounding the well borehole. Four energy windows in the inelastic gamma ray energy spectrum are positioned and their width chosen so that inelastic gamma rays from carbon, oxygen, silicon and calcium are detected. Gamma rays occuring in the carbon and oxygen windows or any combination of the windows may be utilized as an indicator of formation porosity. The carbon/oxygen ratio detected by the present invention can be indicative of the presence of hydrocarbons in the pore space of the earth formations and the silicon/calcium ratio can be indicative of the formation lithology. By appropriately combining measurements of the carbon/oxygen ratio and the silicon/calcium ratio and estimates of the formation porosity, the water saturation $S_W$ of the formation matrix surrounding the borehole may be computed and logged as a function of borehole depth of the well tool. Optimal source to detector spacings, neutron pulse time duration, and neutron pulse repetition rates for achieving the above results are disclosed.

The above and other objects, features and advantages of the present invention are pointed out with particularity in the appended claims. The present invention is best understood by taking the following detailed description in conjunction with the appended drawings in which:

BRIEF DESCRIPTION OF THE DRAWINGS

FIG. 1 is an overall schematic block diagram of a well logging system in accordance with the invention.

FIG. 2 is a timing diagram showing the relationship of accelerator and detector "on" time with respect to gamma rays caused by the inelastic scattered neutrons and the thermal neutrons in the vicinity of the borehole.

DESCRIPTION OF THE PREFERRED EMBODIMENT

Figure 3:
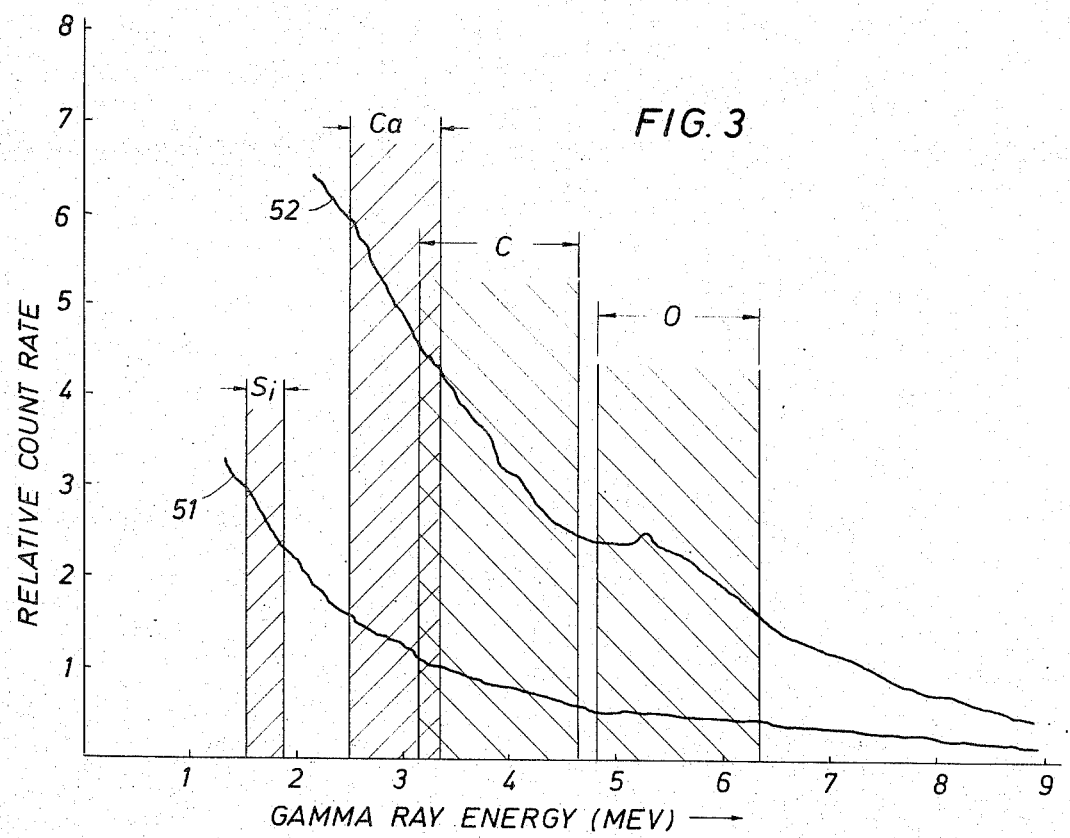
FIG. 3 shows a graphical representation of a gamma ray spectrum resulting from the inelastic scattering of neutrons and showing the relative location of the Si, Ca, C, and O inelastic gamma ray energy windows.

Referring initially to FIG. 1 there may be seen a simplified functional representation in the form of a block diagram of well logging apparatus in accordance with the present invention. A borehole 2 penetrating earth formations 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated, fluid tight, hollow body member or sonde 7 which, during the logging operation is passed longitudinally through the casing 4 and is sized for passage therethrough. Surface instrumentation whose function will be discussed in more detail subsequently is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional armoured well logging type and may have one or more electrical conductors for transmitting such signals between the sonde 7 and the surface apparatus.

Again referring to FIG. 1, the sonde 7 contains a source of high energy neutrons 11. The neutron source contemplated for use herein is a pulsed neutron source operating from the principle of the deuterium-tritium reaction. However, it will be understood by those skilled in the art that the invention is not limited thereto. Other types of pulsed neutron sources may be used if desired. A suitable radiation detector comprising a photomultiplier tube 10 and a detector crystal 12 is provided in the sonde 7 for detecting gamma rays resulting from the inelastic scattering of high energy neutrons by the earth formations 3 surrounding the well borehole 2. A radiation shield 13 of iron, lead or other suitable material is interposed between the neutron accelerator 11 and the detector crystal 12 of the apparatus. Additionally a thermal neutron shielding sleeve 15 may be provided as shown about the detector crystal 12 on either the interior or the exterior wall portion of the sonde. A thermal neutron shielding disc 16 is interposed between the radiation shielding material 13 and the detector crystal 12 to reduce the probability of thermal neutrons reaching the detector crystal. The detector crystal 12 may comprise a thallium doped sodium iodide, cesium iodide or other like activated material which is optically coupled to the photomultiplier 10.

The radiation shielding 13 reduces the probability of direct irradiation of the detector crystal by neutrons emitted from the pulsed neutron source or accelerator 11. The thermal neutron shielding disc 16 and cylinder 15 surrounding the detector crystal may be comprised of boron or any other suitable material having a high thermal neutron capture cross section. This shield serves to further reduce the possibility of thermal neutrons which follow a tortuous path and have been slowed by the borehole fluid 5 or the shielding material 13 from reaching the vicinity of the detector crystal and possibly causing neutron activation of the iodine or other elements comprising the crystal. Moreover, the thermal neutron shield reduces the probability of thermal neutrons from a previous accelerator neutron pulse interacting with materials in the sonde itself or the detector crystal itself and causing the emission of gamma radiation during the time period when the inelastic neutron gamma rays are being observed.

As is well known in the art, the scintillation crystal 12 produces a discrete flash of light whenever a gamma ray passes therethrough and exchanges energy with its crystal lattice. The photomultiplier tube 10 generates a voltage pulse proportional in height to the intensity of each such scintillation which occurs in the crystal 12. The intensity of such scintillations is functionally related to the energy of the gamma ray causing the light flash and thus a voltage pulse generated by the photomultiplier tube 10 has an amplitude functionally related to the energy of the corresponding gamma ray. These proportional voltage pulses produced by photomultiplier tube 10 comprise a detector signal which is supplied to a linear amplifier 17 via a discriminator 18. The discriminator 18 may be used if desired to discriminate, for example, against low energy background gamma radiation resulting from the thermal activation of the detector crystal by the reaction $I^{127} (N,\gamma) I^{128}$. A preset bias level may be used to pass only pulses from the photomultiplier tube 10 exceeding the height corresponding to 1.78 MEV gamma rays generated in the inelastic scattering of neutrons by silicon. Low energy background gammas contributing to pulse pileup could be eliminated in this manner. Also, the discriminator, being located downhole, reduces the counts rate supplied to the cable, thus enhancing the possibility of not having pulse pileup.

The neutron accelerator 11 is preferably operated by a pulsing circuit 14, which may be of conventional design as known in the art, and functions to operate the accelerator in short duration pulses. The pulsing circuit 14 may be controlled by timing pulses from a surface timing reference 39 communicated over the cable 8 conductors and which may also be supplied to a downhole reference pulser 20. For example, the pulsing circuit 14 could be activated by a timing pulse from time reference 39 to emit a neutron burst of a specified time duration. The frequency of such bursts would then be controlled by the surface timing reference 39. Timing reference 39 may also be located in the sonde, if desired. In the inelastic scattering measurements contemplated in the present invention it would be desirable to use neutron pulses of about five microseconds duration and which are repeated at periodic intervals from approximately 5,000 to 20,000 or more times per second.

Referring now to FIG. 2 the relative time relationship of the neutron bursts or pulses just discussed to the operative gamma ray detector cycle and to the inelastic and thermal neutron populations are shown. The accelerator cycle is represented by the solid curve 33. The inelastic gamma ray population in the vicinity of the detector crystal 12 is represented by the dashed curve 31. The thermal capture gamma ray population in the vicinity of the detector is shown by the dotted line curve 32. The operative detector cycle is represented by the separate solid line curve 34. It will be noted that when the five microsecond neutron pulse of curve 33 commences that the detector has already been activated for approximately one microsecond as indicated by curve 34. This is accomplished by supplying the timing from time reference 39 to a signal gate 22 prior to supplying it, via the cable 8, to the downhole pulser 14.

There is a sudden and rapid build up of the inelastic gamma ray population (curve 31) which is essentially present only during the neutron pulse. The thermal capture gamma ray population (curve 32) builds up much slower and reaches a peak only after the cessation of the 5 microsecond neutron pulse. In the diagram of FIG. 2 it will be noted that the neutron pulses are spaced sufficiently far apart in time for the thermal neutron population (curve 32) to decay to almost zero before the next pulse. However, in general some neutrons are still extant in the vicinity of the detector at the time the subsequent neutron pulse occurs. In this case the boron thermal neutron shielding material 15 and disc 16 is particularly adapted for reducing spurious gamma ray detections resulting from this source by rapidly absorbing such thermal neutrons.

Referring again to FIG. 1 and bearing in mind this timing sequence, it will be observed that during the time the neutron accelerator 11 is activated, output signals from the photomultiplier tube 10 are conducted via a discriminator 18 and a linear amplifier 17 to a cable driver circuit 19 of conventional design. A reference signal having a known amplitude is also supplied by a pulser 20 to the input of the discriminator 18. The reference pulse provided by the downhole pulser 20 is utilized in a gain control device or spectrum stablizer 23 to control the gain of the system in the manner described in the copending patent application Ser. No. 82,028 filed Oct. 19, 1970. This, of course, may be accomplished primarily between neutron pulses as the spectrum stabilizer 23 may be supplied with signals from the pulser 20 continuously or in any desired sequence.

Since both the downhole pulse generator 14 and the surface gate 22 which control data pulses from the downhole tool are timed from the same time reference 39, it is apparent that synchronism may be maintained between the surface equipment and the downhole equipment. Thus the data signals may be gated in a manner at the surface to select portions thereof for processing which are timed as desired relative to the emission of the neutrons in the manner previously discussed with respect to FIG. 2.

Although not depicted in FIG. 1, it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

The output signals from the gate 22 comprise a sequence of count pulses resulting from gamma rays detected by the downhole detector crystal 12 during the time interval that the neutron accelerator 11 is activated. These pulses comprise data mainly from gamma rays resulting from the exitation of nuclei in the vicinity of the detector crystal which have been excited by the inelastic scattering of neutrons emitted by accelerator 11.

The inelastic gamma rays are supplied to a pulse height analyzer 24. The pulse height analyzer 24 may be of conventional design as known in the art and having, for example, four or more channels or energy divisions corresponding to quantizations of the pulse heights of the input pulses, if desired. The pulse height analyzer 24 functions to sort and accumulate a running total of the incoming pulses into a plurality of storage locations or channels based on the height of the incoming pulses which, it will be recalled, is directly related to the energy of the gamma rays causing the pulse. The output of the pulse height analyzer 24 in the case of the present invention consists of count pulses occurring in each of four energy ranges or windows as depicted in FIG. 3.

Referring now to FIG. 3, the relative count rate as a function of energy is shown directly as curve 51. Curve 52 indicates the same relative count rate multiplied by a factor of 4 so that details may be more accurately seen. It will be observed that four energy windows corresponding to silicon (labeled Si), calcium (labeled Ca), carbon (labeled C) and oxygen (labeled O) are provided. In the practice of the method of the present invention, it has been found preferable to use a carbon energy window extending from 3.17 to 4.65 MEV. The oxygen energy window preferably extends from 4.86 to 6.34 MEV. The silicon window is chosen to extend from 1.65 to 1.86 MEV and the calcium window extends from 2.5 to 3.3 MEV. By using this choice of energy windows the 4.4 MEV carbon inelastic gamma ray scattering peak and the 6.13 MEV oxygen inelastic gamma ray energy scattering peaks are covered, togehter with their corresponding single and double pair production escape peaks. The optimal choice of energy range for the silicon window encompasses the 1.78 MEV photo peak for silicon. The calcium energy window illustrated in FIG. 3 does not encompass the 3.73 MEV calcium photo peak due to carbon interference, but does encompass the corresponding single and double escape peaks. It will be understood, of course, that slight variations of this placement of energy windows could be made if desired without compromising the inventive concepts drastically.

The number of counts occuring in each of the four energy windows during the time interval (7 microseconds) that the downhole detector signals are supplied to the pulse height analyzer via the gate 22 are output from the pulse height analyzer 24 as four separate digital signals. (It will be understood, of course, that the individual time interval pulse counts may be integrated over a longer period for better statistical accuracy as known in the art.) The carbon and oxygen count rates are supplied to the carbon/oxygen ratio computer 25. The silicon and calcium count rates are supplied to the silicon/calcium ratio computer 26. Additionally the count rates in the C, O, Si, and Ca windows are fed to a porosity computer 27 whose function will be subsequently described. The ratio computers 25 and 26 may be of conventional design as known in the art.

The silicon/calcium ratio from the ratio computer 26 is supplied to a lime fraction computer 28. The lime fraction computer 28 output together with the output of the porosity computer 27 and the C/O computer 25 output is supplied to the water saturation computer 29. The functioning of the computers 27, 28 and 29 will be described in more detail subsequently. The porosity computer 27 estimates the porosity as a function of the count rate in an individual energy window such as carbon or in a combination of energy windows such as C+Ca, or all four, if desired, and supplies an output signal proportional thereto. This output signal may be recorded together with the silicon/calcium ratio, the carbon/oxygen ratio and a water saturation $S_W$ signal generated by the computer 29. These signals can be recorded as a function of borehole depth by the recorder 30 which is mechanically or electronically linked to the sheave wheel 9 as indicated by the dotted line 42. A log 41 of these quantities as a function of borehole depth is illustrated schematically.

It may be shown that the depth of investigation and the relative amount of formation signal increase gradually with an increased neutron source to detector spacing. However, the number of inelastic gamma rays reaching the detector decreases rapidly with increased spacing. For the detector and deuterium-tritium accelerator used at 5,000 bursts per second, it has been determined that at spacings less than 24 inches there is a considerable amount of pulse pile up (too rapid counting) during the period that the inelastic gamma ray gate 22 is open. As previously discussed, this can lead to a loss of resolution in the energy spectrum of the gamma rays being measured. At source to detector spacings greater than 24 inches at 5,000 pulses per second the number of inelastic gamma rays reaching the detector has been found to diminish in an unfavorable manner. For this reason it has been found desirable to use a spacing of approximately 24 inches from the source to the detector in order to achieve optimum counting results with the instrument at 5,000 pulses per second. Of course, this distance would be changed if improved generators or detectors are made available, or if higher repetition rates for the neutron generator, with a smaller number of neutrons per burst, are employed. For example, if the pulse repetition rate is increased to 20,000 pulses per second, then a spacing of approximately 22 inches has been found satisfactory while avoiding pulse pile up problems.

Figure 4:
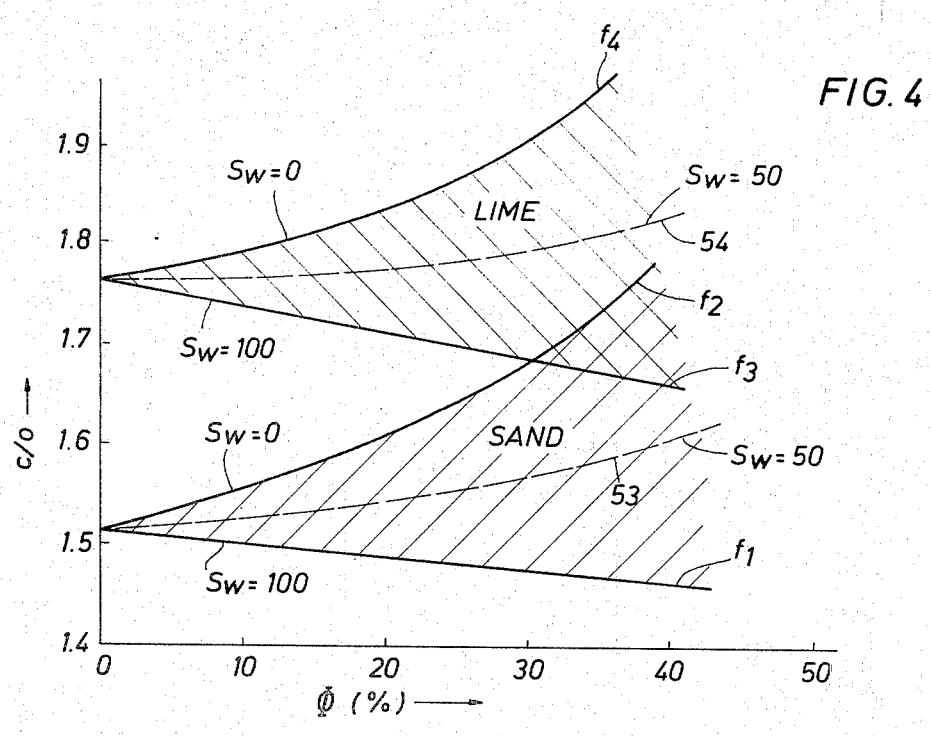
FIG. 4 is a graphical representation showing the C/O ratio as a function of formation porosity for several lithologies and water saturations, as determined from test formation measurements.

Measurements made under test conditions using a well logging system such as that illustrated in FIG. 1 over a plurality of different types of test formations have been found to yield results illustrated graphically in FIG. 4. In FIG. 4 the curve labeled $f_1$ represents the relative ratio of counts in the carbon and oxygen count windows for a plurality of a different sandstone formation porosities at 100 percent water saturation. The curve labeled $f_2$ represents the carbon/oxygen counts ratio in sandstone formations at 0 percent water saturation. Similarly, the curves $f_3$ and $f_4$ represent measurements obtained in limestone formations of varying porosities with 100 percent and 0 percent water saturation, respectively. The dotted line curves 54 and 53 represent the 50 percent water saturation carbon/oxygen ratio logs for limestone and sandstone formations, respectively. From the graphs of FIG. 4 it is apparent that in high porosity formations a carbon/oxygen ratio log by itself would be anomalous as an oil indicator, since, for example, at porosities greater than 30 percent, a carbon/oxygen counts ratio in the range of 1.6 to 1.75 could be either a water saturated limestone as represented by curve $f_3$ or an oil saturated sandstone as represented by curve $f_2$.

In order to resolve such anomalous results the silicon/calcium ratio may be used in order to determine the approximate lithology of the earth formations. It is apparent that the silicon/calcium ratio will vary dramatically when going from a sandstone ($SiO_2$) to a limestone ($CaCO_3$) formation. In going from a sandstone to a limestone formation the calcium content increases while the silicon content decreases. This leads to a much lower silicon/calcium ratio. The inverse is true, of course, in going from a limestone to a sandstone formation. Thus, the Si/Ca ratio curve within a formation is indicative of lithology. Additionally, in order to determine accurately whether water or oil exists in the pore space of the formations some indication of the porosity of the formations is necessary.

The first step in determining water saturation $S_W$ is to quantitatively determine the fractional concentration of sand and lime in the formation matrix. To do this, it is sufficient to determine the relative amounts of silicon and calcium present. Taking the ratio of the count rates in the energy windows previously described for Si and Ca has been found to effectively indicate the matrix and, at the same time, is virtually insensitive to porosity, water saturation and water salinity. If the Si/Ca values are determined for a pure water sand in the well ($R_S$), and a pure water lime ($R_L$), then these two values may be used as calibration points and the fraction of limestone in an unknown sandy lime whose Si/Ca ratio ($R_X$) is measured can be established from the relationship $$(\text{LIME FRACTION})_X = LF_X = (R_S - R_X)/(R_S - R_L) \quad (1)$$

This computation may be performed in the lime fraction computer 28 of FIG. 1, using the measured Si/Ca ratio as indicated in FIG. 1 for input. Representative values for $R_S$ and $R_L$ may be determined by measuring the Si/Ca ratio ($R_S$) in a known water sand in the well at the beginning of the logging run. $R_S$ is known to generally be about 10 percent greater than $R_L$ and thus once $R_S$ is known for the well, $R_L$ may be obtained. When $R_X$ is measured then all of the right side of Equation (1) is known and $LF_X$ may be computed.

The second step in determining the water saturation $S_W$ is to obtain a porosity estimate $\phi$ of the formation. Porosity may be estimated from the count rates observed in any (or all) of the previously defined energy windows from the expression $$\phi (CR) = Me^{-N \cdot CR} \quad (2)$$

where $M$ and $N$ are constants determined by borehole parameters and neutron output. Of course, $e=2.718---$ in the Naperian logarithm base and CR represents the window or combination of windows count rate being used for the estimate. The porosity estimate $\phi$ is computed in the porosity computer 27 of FIG. 1. Of course, if the porosity is known from another source, such as a previous sonic or electrical log, then this porosity estimate may be used in the further computations for the water saturation $S_W$, if desired.

From the graph of FIG. 4 it may be seen that if the curves $f_1, f_2, f_3$ and $f_4$ are thought of as being functions of porosity $\phi$, then to a good approximation $$f_3(\phi) \approx f_1(\phi) + K \quad (3)$$

$$f_4(\phi) \approx f_2(\phi) + K \quad (4)$$

where the constant K is a measure of the increase in the carbon/oxygen ratio caused by the carbon in the limestone matrix and is thus indicative of the amount of limestone present. Thus the carbon/oxygen ratio in a formation with a given water saturation $S_W$ composed of Y% lime and (100−Y)% sand would differ from the carbon/oxygen ratio in a 100 percent sand with the same water saturation and porosity by a factor (K * Y/100).

From Equation (1), $LF_X$ is also an indicator of the percentage limestone in the unknown formation X and thus $LF_X = Y/100$. If $(K * LF_X)$ is subtracted from the carbon/oxygen ratio observed in an unknown formation X the resulting carbon/oxygen ratio value is representative of a pure sand having the same porosity $\phi$ and water saturation $S_W$ as formation X. The water saturation $S_W$ may then be derived by linear interpolation between curves $f_1$ and $f_2$ of FIG. 4.

The water saturation computer 29, using as inputs $LF_X$ and $\phi$ as derived above from Equations (1) and (2) then perform the computation $(K * LF_X)$ and the linear interpolation between $f_1$ and $f_2$. For this purpose $f_1$ and $f_2$ may be approximated as polynominals in $\phi$ so that the computer may evaluate these functions analytically. The resultant water saturation $S_W$ may then be thought of as the "pure sand equivalent" water saturation.

Alternatively, if desired, (not shown) the outputs of the pulse height analyzer 24, FIG. 1 could be recorded in digital or analog form at the well and later input to a general purpose digital computer directly and the indicated computations performed. The resultant outputs from the general purpose computer could then be used to drive the recorder or other display means. In either case the water saturation $S_W$, porosity $\phi$, C/O ratio, and Si/Ca ratio may be logged (41) as a function of borehole depth. Thus, the count rates in the four energy windows of FIG. 3 may be utilized in the technique of the present invention to resolve ambiguities which would heretofore have been unresolvable by combining these data in the manner disclosed.

The above disclosure may make other alternative embodiments of the invention apparent to those skilled in the art. It is the aim of the appended claims to cover all such changes and modifications as fall within the true spirit and scope of the invention.

We claim:

1. A method of determining the water saturation of earth formations surrounding a well bore comprising the steps of:

determining the fractional content of sand and lime in the formation matrix;

determining the porosity of the formation;

determining the carbon/oxygen counts ratio in the inelastic gamma ray energy spectrum in regions thereof corresponding to carbon and oxygen inelastic gamma ray and combining the fractional content of sand and lime, the porosity of the formation, and the carbon/oxygen counts ratio in a predetermined manner to compute the water saturation of the matrix.

2. The method of claim 1 wherein the step of determining the fractional content of sand and lime in the formation matrix is performed by repetitively irradiating the matrix with high energy neutron pulses and measuring gamma radiation due to the inelastic scattering of neutrons by the formation matrix in plural energy ranges.

3. The method of claim 2 wherein said plural energy ranges are chosen to include gamma radiation resulting from the inelastic scattering of high energy neutrons by carbon, oxygen, silicon and calcium nuclei.

4. The method of claim 3 wherein the energy ranges are chosen to be 3.17 MEV to 4.65 MEV for carbon, 4.86 MEV to 6.34 MEV for oxygen, 1.65 MEV to 1.86 MEV for silicon and 2.5 MEV to 3.3 MEV for calcium.

5. The method of claim 1 wherein the step of determining the lime fraction $LF_X$ of an unknown formation X, is performed by measuring the counts ratio $R_X$ of silicon/calcium counts resulting from gamma radiation due to inelastic fast neutron scattering in energy regions in the gamma ray spectrum corresponding to the production of such gamma radiation by silicon and calcium nuclei in the unknown formation, and combining this measurement according to the relationship $$LF_X = (R_S - R_X)/(R_S - R_L)$$

where $R_S$ is the silicon/calcium counts ratio taken with the same instrumentation in a known water sand formation and $R_L$ is the silicon/calcium counts ratio taken with the same instrumentation in a known water lime formation.

6. The method of claim 5 and further including the step of logging the lime fraction $LF_X$ as a function of borehole depth.

7. The method of claim 1 wherein the step of determining the formation porosity is done by computing the porosity $\phi$ in a predetermined manner as a function of the count rates CR in energy regions of the gamma ray energy spectrum corresponding to known gamma ray energies produced by the inelastic scattering of high energy neutrons by the nuclei of carbon, oxygen, silicon and calcium.

8. The method of claim 7 wherein the porosity $\phi$ is computed from said count rate CR according to the relationship $$\phi = M\, e^{-N \cdot CR}$$

where M and N are predetermined calibration constants for a particular logging tool and borehole size and the constant $e = 2.718$- - -, the Naperian logarithm base.

9. The method of claim 8 wherein CR is the count rate from the carbon window only.

10. The method of claim 8 and further including the step of logging the porosity $\phi$ as a function of the borehole depth of a well tool.

11. The method of claim 1 wherein the step of combining the fractional content of sand and lime, the formation porosity, and the carbon/oxygen counts ratio to compute the water saturation $S_W$ of the formation is performed by linearly interpolating by an amount $(K \cdot LF_X)$, where K is a predetermined constant and $LF_X$ is the measured lime fraction in the unknown formation, between two preselected carbon/oxygen counts ratio functions, $f_1(\phi)$ and $f_2(\phi)$, where $f_1(\phi)$ is a function of porosity $\phi$, expressing the carbon/oxygen counts ratio in a water sand and $f_2(\phi)$ is a function of porosity $\phi$, expressing the carbon/oxygen counts ratio in an oil sand.

12. The method of claim 11 wherein the function $f_1(\phi)$ and $f_2(\phi)$ are preselected to be polynomial functions of porosity $\phi$.

13. The method of claim 11 and further including the step of logging the water saturation $S_W$ as a function of the borehole depth of a well tool.

14. The method of claim 1 and further including the step of logging the water saturation $S_W$, the porosity $\phi$, the carbon/oxygen counts ratio and the Si/Ca counts ratio all simultaneously as a function of the borehole depth of a well tool.

15. A method of determining the characteristics of earth formations penetrated by a well borehole comprising the steps of:
passing a well tool having a pulsed neutron source and a gamma ray detector through a well bore;
repetitively irradiating the earth formations surrounding the well bore with high energy neutrons;
measuring the count rates of inelastic gamma rays in the gamma ray energy spectrum in energy regions thereof corresponding to carbon, oxygen, silicon and calcium nuclei excited by the high energy neutron pulses;
determining the carbon/oxygen count rate ratio of the formation;
determining, from the silicon and calcium count rates, the lime fraction of the formation;
determining, from at least one of the above count rates, the formation porosity; and
combining the lime fraction, the carbon/oxygen ratio and the porosity data to derive the water saturation of the formations penetrated by the borehole.

16. The method of claim 15 wherein the neutron pulses have as short a duration as practicable to eliminate interference in the inelastic gamma ray energy spectrum from the buildup of a thermal neutron population.

17. The method of claim 15 and further including the step of recording the water saturation $S_W$, the porosity $\phi$, the C/O ratio and the Si/Ca ratio as a function of borehole depth of said well tool as it moves through the borehole.

18. The method of claim 15 wherein said energy regions corresponding to inelastic gamma rays emitted by excited carbon, oxygen, silicon and calcium are located approximately at the energy range of 3.17 MEV to 4.65 MEV for carbon, 4.86 MEV to 6.34 MEV for oxygen, 1.65 MEV to 1.86 MEV for silicon, and 2.5 MEV to 3.3 MEV for calcium.

19. The method of claim 15 wherein the step of combining the lime fraction, the carbon/oxygen ratio and the porosity to compute the water saturation $S_W$ is performed by linearly interpolating between two preselected carbon/oxygen ratio functions, $f_1(\phi)$ and $f_2(\phi)$ where $f_1$ and $f_2$ are functions of the porosity $\phi$ expressing the carbon/oxygen counts ratio in an oil sand and a water sand respectively, by an amount related directly to the lime fraction.

* * * * *